United States Patent
Pickering et al.

(10) Patent No.: US 8,548,989 B2
(45) Date of Patent: Oct. 1, 2013

(54) QUERYING DOCUMENTS USING SEARCH TERMS

(75) Inventors: John B. Pickering, Winchester (GB); Fenglian Xu, Knightwood (GB)

(73) Assignee: International Business Machines Corporation, Armonk, NY (US)

(*) Notice: Subject to any disclaimer, the term of this patent is extended or adjusted under 35 U.S.C. 154(b) by 4 days.

(21) Appl. No.: 13/184,164

(22) Filed: Jul. 15, 2011

(65) Prior Publication Data
US 2012/0030201 A1 Feb. 2, 2012

(30) Foreign Application Priority Data
Jul. 30, 2010 (EP) .................................. 10171463

(51) Int. Cl.
*G06F 7/00* (2006.01)
(52) U.S. Cl.
USPC .......... 707/722; 707/728; 715/210; 715/234; 715/255
(58) Field of Classification Search
None
See application file for complete search history.

(56) References Cited

U.S. PATENT DOCUMENTS

| | | | |
|---|---|---|---|
| 6,189,002 B1 * | 2/2001 | Roitblat ............................. 1/1 |
| 6,327,590 B1 * | 12/2001 | Chidlovskii et al. .......... 707/734 |
| 7,251,781 B2 * | 7/2007 | Batchilo et al. ............... 715/210 |
| 7,346,490 B2 | 3/2008 | Fass et al. |
| 7,440,947 B2 | 10/2008 | Adcock et al. |
| 7,788,261 B2 * | 8/2010 | Hoeber et al. ................. 707/728 |
| 8,041,699 B2 * | 10/2011 | Sacco ........................... 707/705 |
| 8,131,716 B2 * | 3/2012 | Chevalier et al. ............ 707/723 |
| 8,180,768 B2 * | 5/2012 | Ceri et al. ..................... 707/728 |
| 2002/0087530 A1 * | 7/2002 | Smith et al. ..................... 707/3 |
| 2002/0138528 A1 * | 9/2002 | Gong et al. .................... 707/530 |
| 2003/0079185 A1 * | 4/2003 | Katariya et al. .............. 715/530 |
| 2004/0068486 A1 * | 4/2004 | Chidlovskii ..................... 707/3 |
| 2004/0133418 A1 | 7/2004 | Turcato et al. |
| 2004/0186831 A1 | 9/2004 | Hiratsuka et al. |
| 2006/0259462 A1 * | 11/2006 | Timmons ......................... 707/3 |
| 2007/0185831 A1 | 8/2007 | Churcher |
| 2008/0189269 A1 * | 8/2008 | Olsen ............................... 707/5 |
| 2009/0055373 A1 * | 2/2009 | Haviv-Segal .................... 707/5 |
| 2009/0055386 A1 | 2/2009 | Boss et al. |
| 2009/0292683 A1 * | 11/2009 | Kanungo et al. ................ 707/5 |
| 2009/0327213 A1 * | 12/2009 | Choudhary ..................... 707/2 |
| 2010/0257127 A1 * | 10/2010 | Owens .......................... 706/12 |

* cited by examiner

*Primary Examiner* — Fred I Ehichioya
*Assistant Examiner* — Hasanul Mobin
(74) *Attorney, Agent, or Firm* — Patterson & Sheridan, LLP

(57) ABSTRACT

Techniques are disclosed for searching a set of documents using search terms. In one embodiment, a summary is provided for each document in the set. Search terms are received, and the set of documents are parsed using the received search terms. A first relevance value is calculated using only the summary of each document. A subset of documents having the highest relevance is provided by using the first relevance value. The subset of documents is parsed using the received search terms, to calculate a second relevance value for each document using the respective document. Query results are provided, the query results including documents having the highest relevance according to the second relevance value.

16 Claims, 6 Drawing Sheets

QUERYING DOCUMENTS USING SEARCH TERMS

CROSS-REFERENCE TO RELATED APPLICATION

This patent application claims priority under 35 U.S.C. §119 to European Patent Application No. 10171463.2 filed Jul. 30, 2010 by Fenglian Xu and Brian Pickering, assigned to International Business Machines Corporation, titled "Method and Apparatus for Searching Documents," which is herein incorporated by reference in its entirety.

BACKGROUND

Performing a word search over a large set of documents may be time consuming in some cases. The word search may be sped up by creating an index of the document set for every word. However, in a simple index, all the documents are equally related to a search word, because the individual documents are not rated. The word search may be sped up even further by using a relevance index, which indicates to what extent each word is relevant in each document. For example, a relevance index may list the number of occurrences of each word in each document.

However, a relevance index does not include associated words; for example, synonyms, hyponym/hypernym pairs and meronym/holonym pairs. A synonym of a target word is an alternative word for the target word; for example, notebook and laptop are synonyms and alternatives for one another. An association of the type "is a kind" of is a hyponym/hypernym pair, also called a child/parent pair. For example, "laptop" is a kind of "computer" and here, "laptop" is a hyponym (child) and "computer" is a hypernym (parent). In the case of verbs, the association can be understood better by "is one way to," for example, to type "is one way to" input. An association of the type "is an instance of" is also a hyponym/hypernym pair. For example, "Einstein" is an instance of a "physicist." An association of the type "is a member of," "is a part of," "is a substance of" is a meronym/holonym pair, also called a member/group pair. In these cases the meronym in some way belongs to the holonym. Examples: a "key" is a part of a "keyboard" and "microprocessor" is a substance of "computer."

An association dictionary for indexed terms allows each word to have associated documents, that is, associated words of the search terms that are in the document. For any search word in any document, a relevance index will show the number of occurrences of the word and the number of occurrences of different types of associated words. An algorithm based on the occurrences can generate a value to indicate the relevance of each document for each word. The value can be generated because more than one search word the occurrence algorithm can generate more than one value, and these values can be combined to indicate an overall relevance of the words to the document.

SUMMARY

Embodiments of the invention provide a computer-implemented method, computer program product and system for performing an operation that includes providing a summary for each document in the set. The operation also includes receiving search terms and parsing the set of documents using the received search terms. The operation also includes calculating a first relevance value using the summary of each document. The operation also includes providing a subset of documents having the highest first relevance values. The operation also includes parsing the subset of documents using the received search terms to calculate a second relevance value for each document using the respective document. The operation also includes providing query results comprising documents having the highest second relevance values.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide techniques for querying a set of documents using search terms. One embodiment provides a computer program configured to provide a summary for each document in the set. The computer program is further configured to receive search terms and parse the set of documents using the received search terms. The computer program is further configured to calculate a first relevance value using the summary of each document. The computer program is further configured to provide a subset of documents having the highest first relevance values. The computer program is further configured to parse the subset of documents using the received search terms and calculating a second relevance value for each document using the respective document. The computer program is further configured to provide query results, which include documents having the highest second relevance values.

Advantageously, documents may be queried more quickly and with an increased search depth at least in some cases, relative to alternative embodiments, such as alternative embodiments that sacrifice search depth to reduce search time. In particular, the computer program may better scale (in terms of search time) with the number of documents and/or the search depth at least in some cases, as compared to the alternative embodiments. Further, the computer program may more precisely query the set of documents, as compared to some alternative embodiments that use the relevance index, which merely averages word occurrence over a whole document. In particular, the computer program may take into account that some parts of a given document may be more significant than other parts of the document, for purposes of the query.

Figure 1:
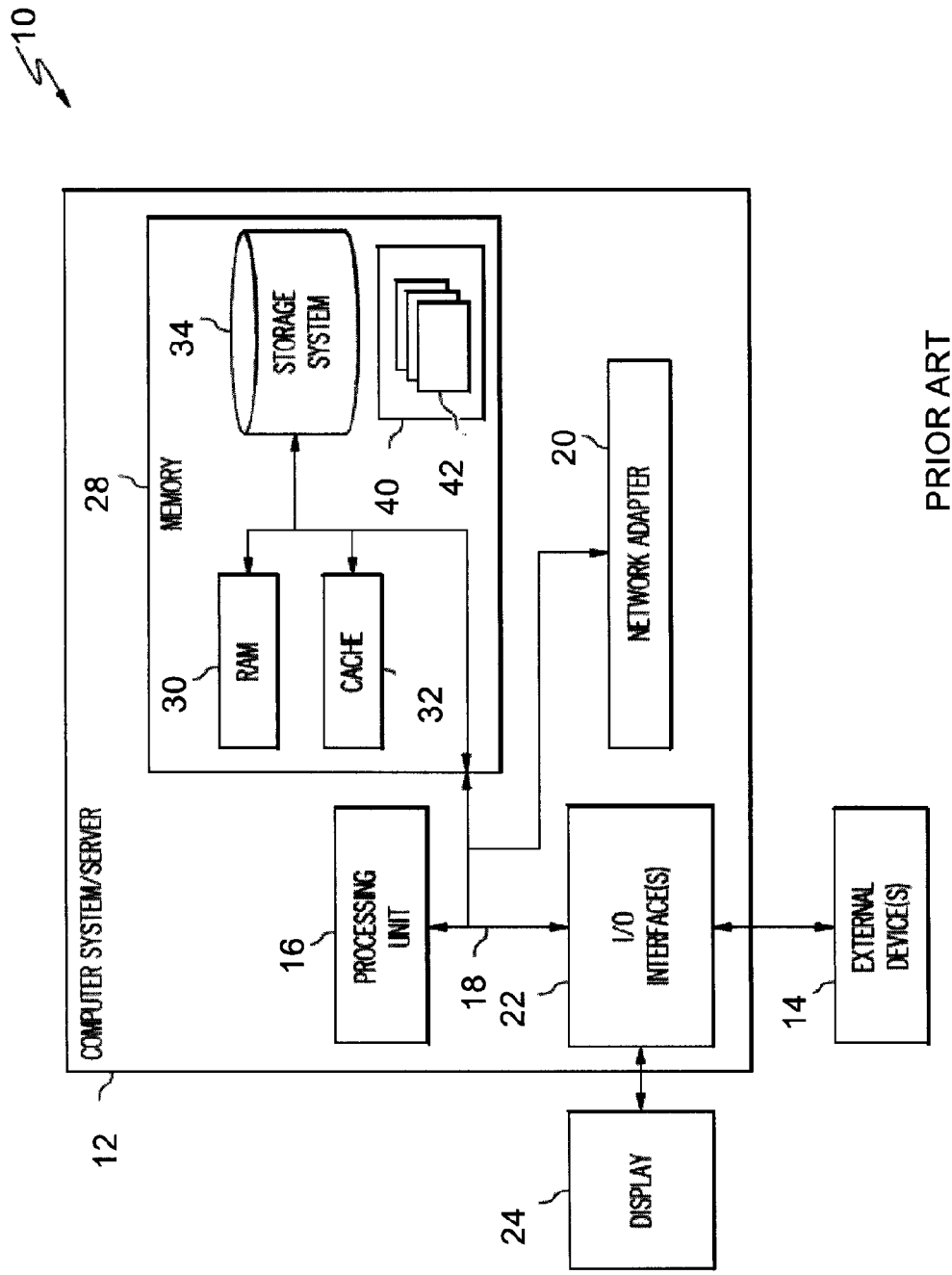
FIG. 1 is a component diagram of a computer system, according to one embodiment of the invention.

Referring to FIG. 1, there is shown a component diagram of a computer 10 according to the embodiments of the invention. Computer 10 includes a computer system or server 12 that is operational with numerous other general purpose or special purpose computing system environments or configurations. Examples of well-known computing systems, environments, and/or configurations that may be suitable as computer system 12 or for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems and distributed cloud computing environments that include any of the above systems or devices.

Computer system 12 may be described in the general context of computer system-executable instructions, such as program modules, being executed by a computer system. Generally, program modules may include routines, programs, objects, components, logic, data structures, and so on, that perform particular tasks or implement particular abstract data types. Computer system 12 may be embodied in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer 10 is shown in the form of a general-purpose computing device. The components of computer system 12 may include, but are not limited to, one or more processors or processing units 16, memory 28 and bus 18 that couples various system components including memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnects (PCI) bus.

Computer system 12 typically includes a variety of computer system readable media. Such media may be any available media that is accessible by computer system 12 and it includes both volatile and non-volatile media, removable and non-removable media.

Memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (for example, a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program 40 having a set (for example, at least one) of program modules 42 that are configured to carry out the functions of embodiments of the invention.

Program 40 may be stored in memory 28 by way of example, and not limitation, as well as an operating system, one or more application programs, other program modules, and program data. Each of the operating system, one or more application programs, other program modules and program data, or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device or a display 24; one or more devices that enable a user to interact with computer system 12; and/or any devices (for example a network card or modem) that enable computer system 12 to communicate with one or more other computing devices. Such communication occurs via input/output (I/O) interface/s 22 of computer system 12. Computer system 12 further includes network adapter 20 for communicating with one or more networks such as a local area network (LAN), a general wide area network (WAN), and/or a public network (for example the Internet). As depicted, network adapter 20 communicates with the other components of computer system 12 via bus 18. It should be understood that although not shown, other hardware and/or software components could be used in conjunction with computer system 12. For example, microcode, device drivers, redundant processing units, external disk drive arrays, RAID systems, tape drives and data archival storage systems.

Figure 2:
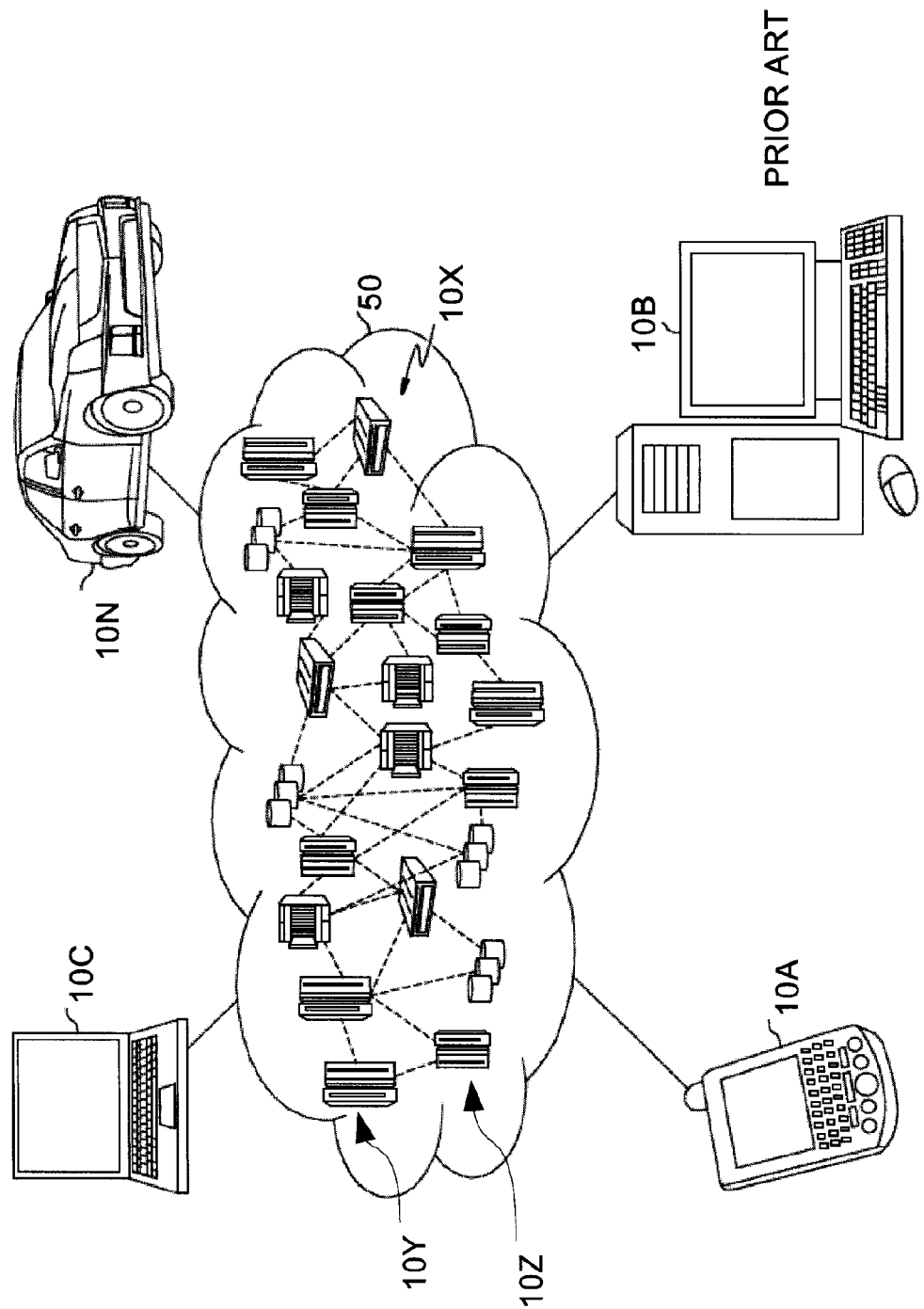
FIG. 2 is a component diagram of a computer network including computer systems, according to one embodiment of the invention.

Referring now to FIG. 2, illustrative computing environment 50 is depicted. As shown, computing environment 50 includes one or more networked computers, for example, 10X, 10Y and 10Z. Computing environment 50 communicates with local computers, for example, personal digital assistant (PDA) or cellular telephone 10A, desktop computer 10B, laptop computer 10C, and automobile computer system 10N. Networked computers 10X, 10Y and 10Z in computing environment 50 typically communicate with one another using a standard protocol. They may be grouped (not shown) physically or virtually, in one or more smaller networks, such as private networks, community networks, public networks, or hybrid networks. Computing environment 50 offers infrastructure, platforms and/or software as services for which a consumer does not need to maintain resources on a local computing device. Computing environment 50 or one or more of the groups may be referred to as a cloud network. It is understood that the computers 10A-X shown in FIG. 2 are intended to be illustrative only and that computers 10X, 10Y and 10Z and computing environment 50 can communicate with any type of computerized device over any type of network and/or network addressable connection (for example using a web browser).

Figure 3:
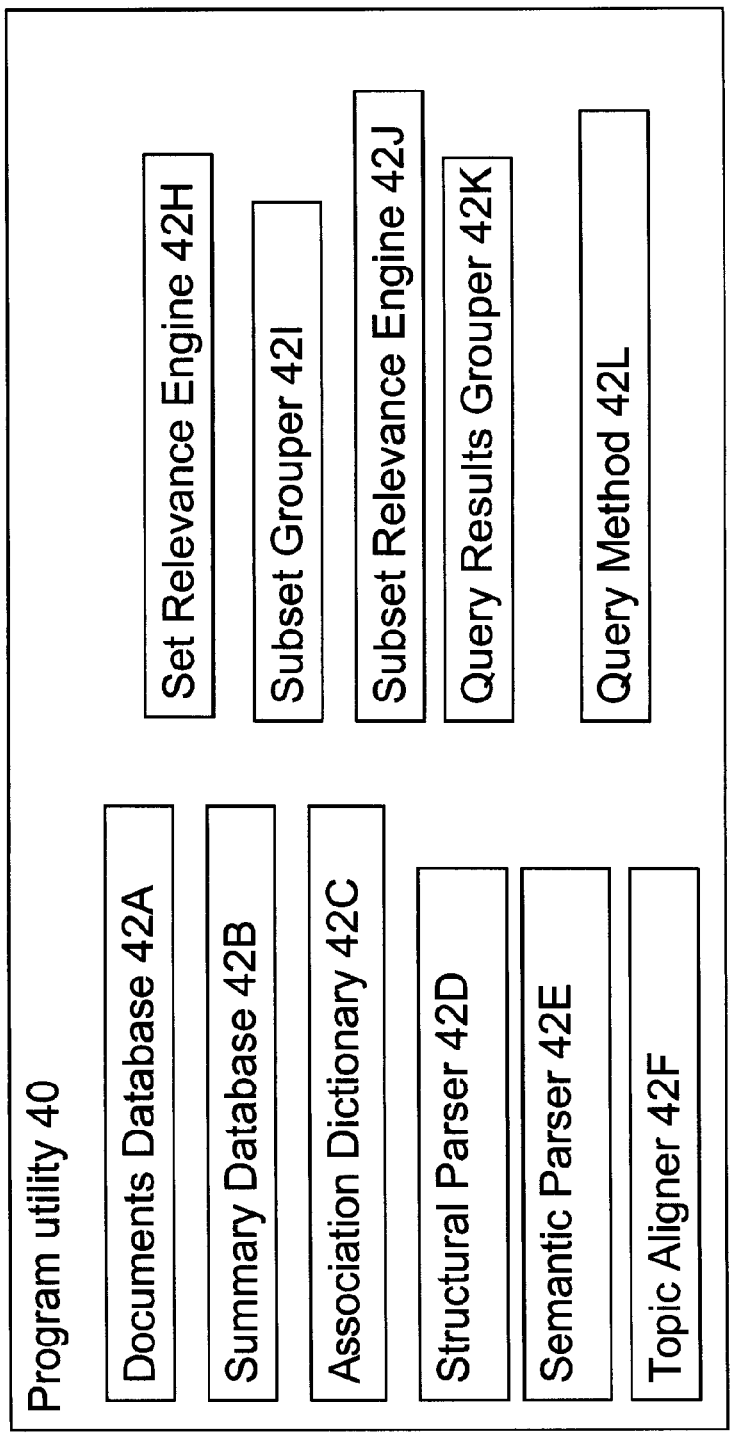
FIG. 3 is a component diagram of a computer program utility, according to one embodiment of the invention.

With reference to FIG. 3, a program 40 in a computer system 12 of computer 10X within computing environment 50 according to one embodiment is described. In this embodiment, a client computer (for example client 10A) sends a query request through computing environment 50 to computer system 12 for processing under the control of program 40.

Program 40 includes the following modules: documents database 42A; summary database 42B; association dictionary 42C; structural parser 42D; semantic parser 42E; topic aligner 42F; set relevance engine 42H; subset grouper 42I; subset relevance engine 42J; query results grouper 42K; and query method 42H. Documents database 42A stores target documents in the set. Summary database 42B stores summary documents associated with each respective target document.

Association dictionary 42C is a database comprising pairs of words that are associated with each other in general use and also in technical domains. In one embodiment, there are three different association types: 1) a synonym type (alternatives) for the specific technical domain; 2) a hyponym/hypernym (child/parent) association type; and 3) a meronym/holonym (member/group) association type. Each pair of words is categorized with its association type.

Structural parser 42D includes processing logic that parses the internal structure of each target document to provide a summary for each target document. One embodiment uses Hyper-Text Markup Language version 4.0 (or HTML 4.0) as base format and the structural parser 42D converts other document formats into the base format with appropriate converters. Popular formats such as Microsoft Word .doc format, Open Document Format .odf and Portable Document Format .pdf can be converted into HTML with the appropriate converters. (Microsoft is a trademark of Microsoft Corporation.) The internal structure of a document is referenced either by pre-existing tags embedded within the target document or by tags created by the semantic parser 42E and topic aligner 42F.

In one embodiment, tags that reference structure in a target document include: <title>; <paragraph>; <section>; <chapter>; and <summary>. Structural parser 42D can immediately use pre-existing tags in the target document to extract the information from the target document and place the information and tags in the summary document. Information that is not be tagged in the target document cannot necessarily be initially extracted, and control passes to the semantic parser 42E and the topic aligner 42F. The semantic parser 42E and topic aligner 42F perform analysis on the document, as described below, and create tags in the summary document referencing the original document. The structural parser 42D uses the tags in the summary document to extract the information from the target document and places it in the summary document with the tags.

Semantic parser 42E includes processing logic that tags topics and body text pairs in a target document by looking at punctuation, individual document sections and headwords. In one embodiment, if a paragraph has no separate heading, then it is not considered. The tags are placed in the summary document. Once this has been completed for multiple (or all) sections control is passed to the topic aligner 42F.

Topic aligner 42F includes processing logic that operates on the list of tags in the summary document to give them hierarchy. It uses the association dictionary 42C to calculate the relevance of each topic and body pair to one another. In one embodiment, this is achieved by comparing each word in one topic with each word in another topic. For each word pair an association value can be calculated that indicates whether the words in each topic have: 1) no association; or 2) are more like synonyms; or 3) are more like a child/parent pair; or 4) are more like a member/group pair. An average value can be found for each association type for all word pairs considered; the topic is then associated with the strongest association type. Topic aligner 42F uses the title of a document as the root topic and all associations in that document are ultimately based on an association with the root topic. Hierarchical tag information referencing the target document is placed in the associated summary document and control is passed back to the structural parser to parse and extract the higher level summary information.

In one embodiment, set relevance engine 42H includes processing logic that determines a summary relevance value for each summary document based on the search terms. Subset grouper 42I includes processing logic that groups the most relevant documents using the summary relevance value into a subset. Subset relevance engine 42J includes processing logic that determines a document relevance value of each target document in the subset based on the search terms and the search term associations. In one embodiment, the calculation for the document relevance value is the same as the calculation for the summary document value, except that it is performed on a smaller number of documents, thereby saving processing time for the computer. Query results grouper 42K is processing logic that determines the most relevant target documents from the document relevance value and presents these most relevant documents as the search results.

Figure 4:
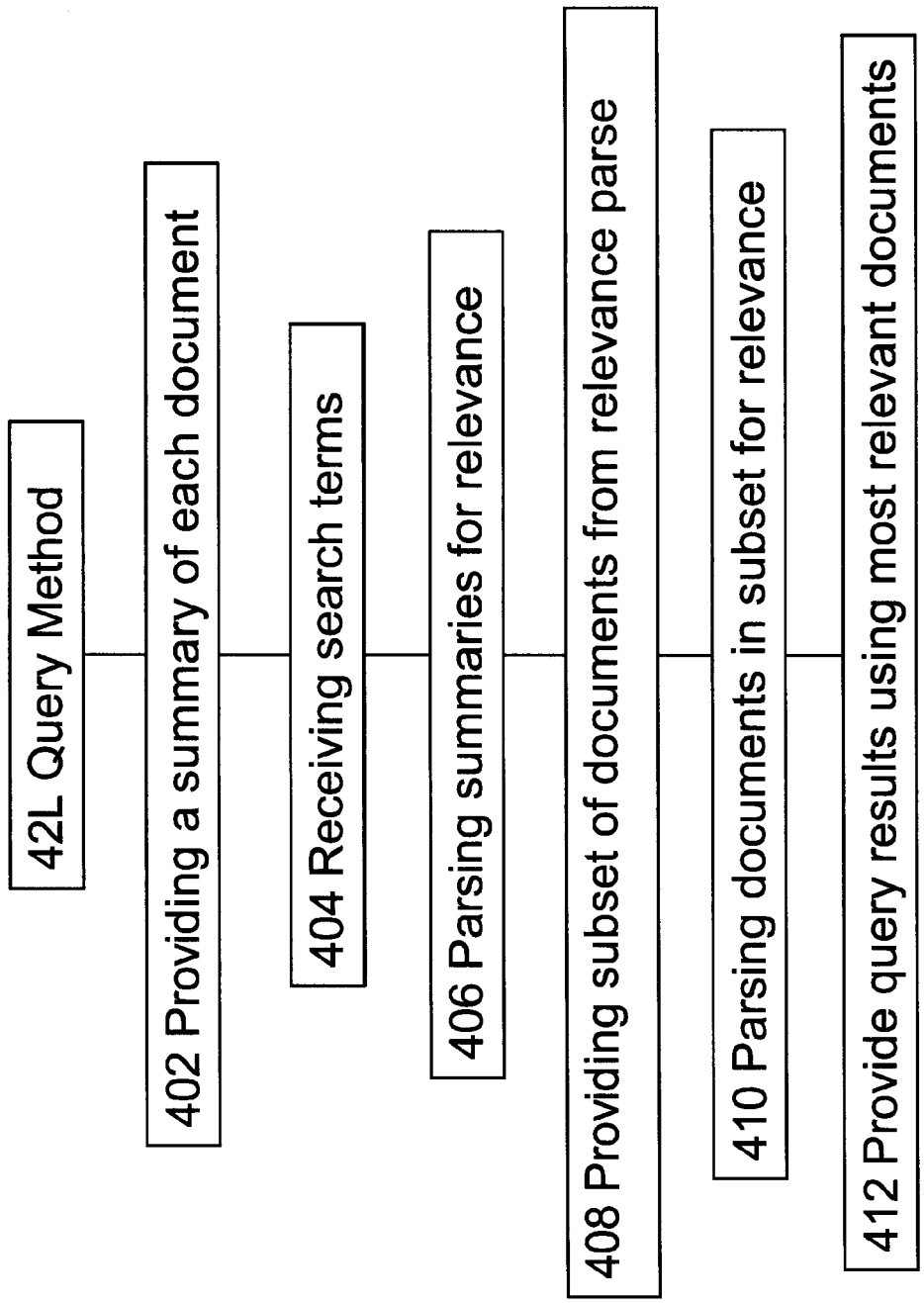
FIG. 4 is a flowchart depicting a method for searching a set of documents, according to one embodiment of the invention.

Query method module 42L is described with reference to FIG. 4 and includes processing logic for performing steps 402, 404, 406, 408, 410 and 412. As shown in FIG. 4, step 402 is for providing a summary document for each document in the set, where the summary document is based on existing higher level contents of the document. This step provides a summary of meaningful information that is quick to scan for relevance. The sub-steps of step 402 are described below with reference to FIG. 5.

Step 404 is for receiving the search terms from the user. Step 406 is for parsing the provided summary documents of the whole set of documents using the received search terms and calculating a first relevance value based on the summary of each document. In one embodiment, the first relevance value is calculated using the number of occurrences of search terms and the number of occurrences of associated words.

Step 408 is for providing a subset of documents having the highest relevance by using the first relevance value to filter the entire document set. In one embodiment, a first relevance threshold is based on the first relevance value, so that the documents in the subset will have a relevance value higher than the first relevance threshold.

Step 410 is for parsing the content for each document in the subset using the received search terms and calculating a document relevance value for each document. In one embodiment, the document relevance value is calculated using a similar algorithm as the first relevance value, i.e., using the number of occurrences of search terms and the number of occurrences of associated words.

Step 412 is for providing query results to the user; documents having the highest relevance using the document relevance value are selected. In one embodiment, a second threshold relevance value is chosen whereby selected documents have a higher relevance than the second threshold relevance. In defining an expected threshold value, user expectation can be compared to the selected documents.

Figure 5:
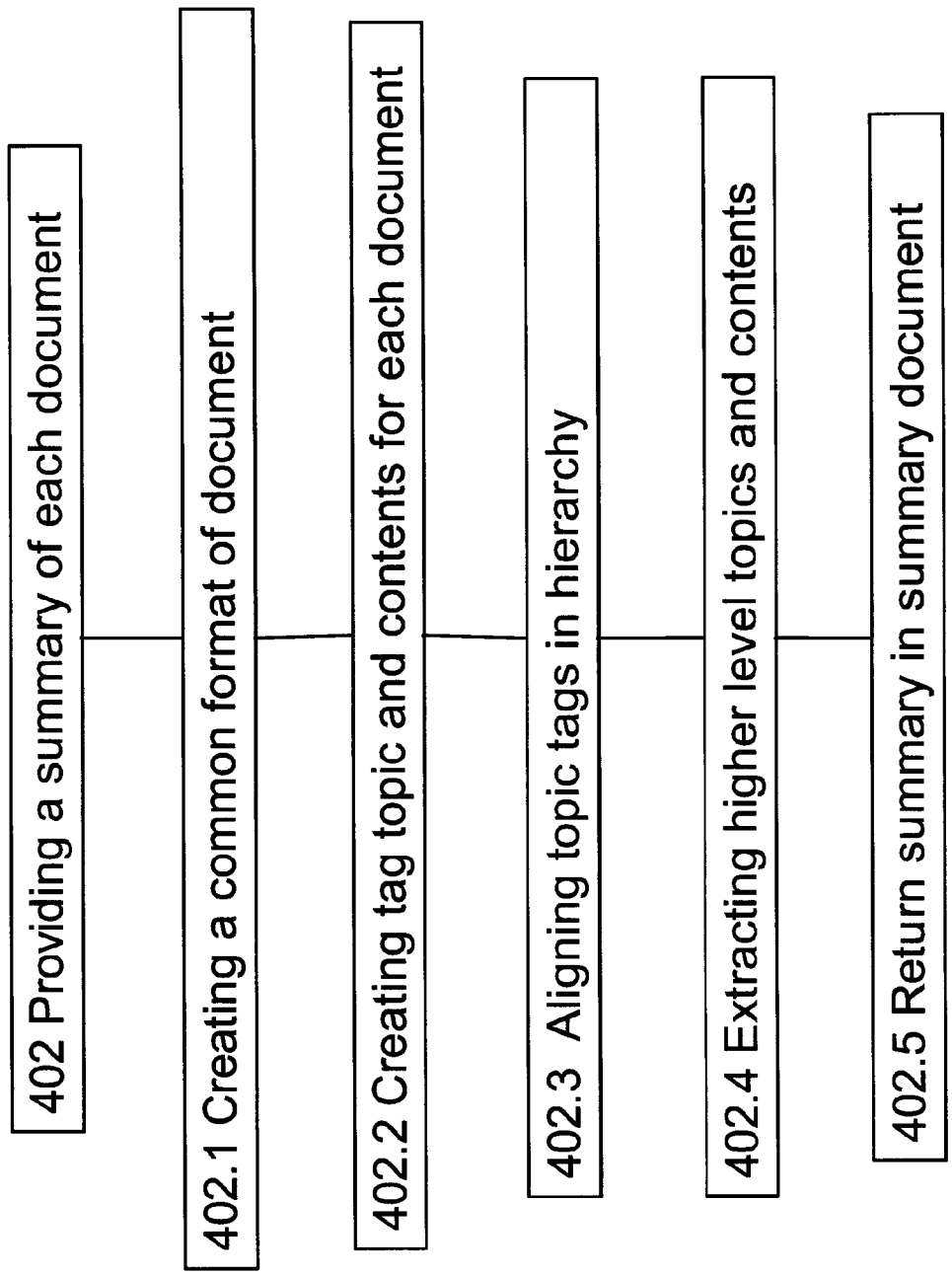
FIG. 5 is a flowchart depicting a method for providing a document summary, according to one embodiment of the invention.

Referring to FIG. 5, the processing logic of step 402 includes sub-steps 402.1; 402.2; 402.3; 402.4 and 402.5 for providing a summary of a document. Sub-step 402.1 includes processing logic for creating a common format for documents that are not in the common format. In one embodiment, the common format is HTML. Sub-step 402.2 includes processing logic for creating a flat list of tags in a summary document for topics and contents of each document. Sub-step 402.3 includes processing logic for operating on the flat list of tags in the summary documents to convert it into a hierarchical list of tags. Sub-step 402.4 includes processing logic for parsing the tags in the summary document and locating the top level items in the hierarchical list including topics, higher level contents and abstracts. Sub-step 402.5 includes processing logic for extracting the located items into each respective summary document and returning control to the query method 42G.

Figure 6:
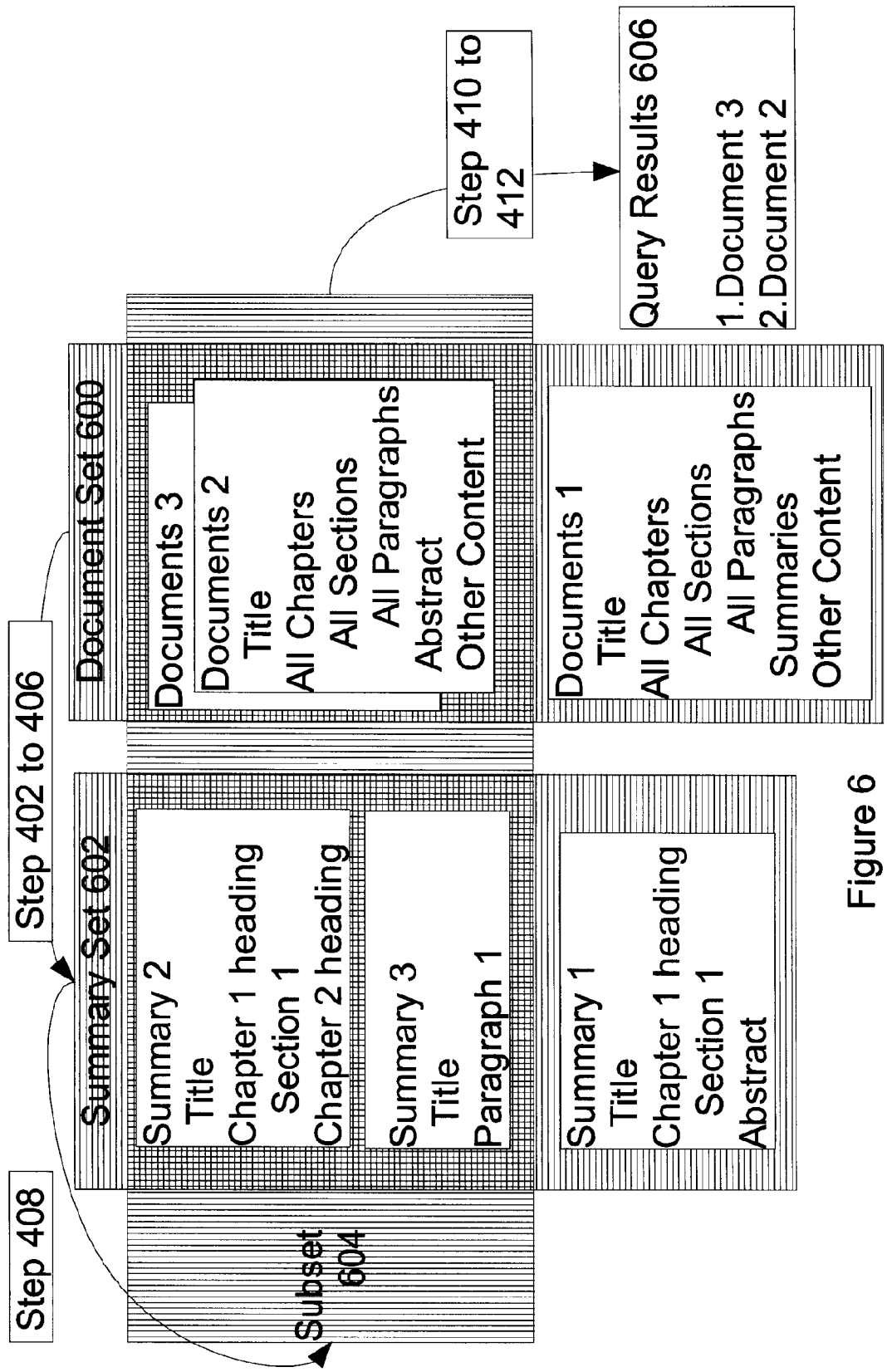
FIG. 6 illustrates a set of documents being searched, according to one embodiment of the invention.

Referring to FIG. 6 there is described an example of one embodiment, provided to help understand embodiments of the invention. The example includes: document set 600 transforming into a summary set 602 via steps 402 to 406; summary subset 604 being identified at step 408; and summary subset 604 being transformed into query results 606 using steps 410 to 412. Document Set 600 includes documents 1, 2 and 3 each comprising different mix of: title; a plurality of chapters, a plurality of sections, a plurality of paragraphs, an abstract or summary; and other content such as figures or tables.

Step 402 provides a summary of each document shown by summary set 602 including summary 1, 2 and 3. Each summary will reflect the original structure and content of the individual documents and how that is interpreted. In this example, the summary documents include parts of the original documents as follows. Summary 1 includes: a title, chapter 1 heading; section 1 and an abstract. Summary 2 includes: a title; chapter 1 heading; section 1 and chapter 2 heading. Summary 3 includes a title and paragraph 1.

Step 404 provides the search terms. Step 406 parses the summaries to calculate a relevance for the summaries to the search terms. Step 408 defines subset 604 from the relevance calculations and, in this example, only summary 2 and summary 3 are considered relevant. For example, summary 1 could have a relevancy of 1; summary 2 and summary 3 could have a relevancy of 3. If the threshold relevancy value is 2 the relevancy value of summary 1 would be too low.

Step 410 parses the documents of subset 604 (in this example documents 2 and documents 3) to calculate a relevance of the whole document to the search terms. Step 412 groups the results in the order of relevance. In the present example, document 3 is found to be more relevant than document 2. In an alternative embodiment that may be faster at least in some cases, a fixed percentage subset of the full set is provided, for example a subset of 20% of the subset is selected.

In an alternative embodiment which may be more precise at least in some cases, an algorithm using additional second order associations calculates a more precision second relevance. The embodiment saves time over the prior art by selecting a reduced number of documents. Accordingly, the embodiment can use this saved time to provide a deeper search and more precise result than the prior art without using any additional time over the prior art.

In another embodiment, a subset of the first order associations may be used to speed up the searching process at least in some cases. Further, in another embodiment, providing the summary includes, for each document, identifying content marked by hierarchical tags and associating a summary with the content of the higher order markers. This embodiment is different from other embodiments in that the sentences deemed a part of the title and section headings are included in the summaries; whereas text deemed to be a part of the body of the text are not included in the summary.

In another embodiment, the summaries are derived from the titles themselves. For each document a title sentence is identified and a third relevance value between the title terms and every other sentence in the document is calculated. Then a summary is created from the title terms and the more relevant sentences using the third relevance value. Further, in another embodiment, which may be faster at least in some cases, a fixed percentage of the full set of documents is provided, for example a subset of 20% of the original search set is selected.

In one embodiment, the first parse of the summaries is a full text parse producing a custom index of the search terms, and the second parsing of the full text also produces a custom index of the search terms. However, in another embodiment, indexing is used to increase the speed of the search results and parsing the summaries includes parsing the index of the summaries, whereby the summaries themselves have been parsed and indexed previously. Likewise, parsing the documents includes parsing an index of the documents, whereby the documents have been parsed and indexed previously.

It will be clear to one of ordinary skill in the art that all or part of the method of embodiments of the present invention may suitably and usefully be embodied in a logic apparatus, or a plurality of logic apparatus, comprising logic elements arranged to perform the steps of the method and that such logic elements may include hardware components, firmware components or a combination thereof.

It will be equally clear to one of skill in the art that all or part of a logic arrangement according to embodiments of the present invention may suitably be embodied in a logic apparatus comprising logic elements to perform the steps of the method, and that such logic elements may include components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors, and that the software may be provided in the form of one or more computer program elements carried on any suitable data-carrier such as a magnetic or optical disk or the like. Channels for the transmission of data may likewise include storage media of all descriptions as well as signal-carrying media, such as wired or wireless signal-carrying media.

Embodiments of the invention may further suitably be embodied as a computer program product for use with a computer system. Such an implementation may include a series of computer-readable instructions either fixed on a tangible medium, such as a computer readable medium, for example, diskette, CD-ROM, ROM, or hard disk, or transmittable to a computer system, using a modem or other interface device, over either a tangible medium, including but not limited to optical or analogue communications lines, or intangibly using wireless techniques, including but not limited to microwave, infra-red or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infra-red, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Alternatively, embodiments of the present invention may be realized in the form of a computer implemented method of deploying a service comprising steps of deploying computer program code operable to, when deployed into a computer infrastructure and executed thereon, cause the computer system to perform all the steps of the method.

Still alternatively, embodiments of the present invention may be realized in the form of a data carrier having functional data thereon, said functional data comprising functional computer data structures to, when loaded into a computer system and operated upon thereby, enable said computer system to perform all the steps of the method.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, the documents may be stored in the cloud. The computer program utility may also execute in the cloud. Doing so allows the user to search the documents from any computing system attached to a network connected to the cloud (e.g., the Internet).

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method to query a set of documents based on multiple relevance value types, the method comprising:
   providing, for each document in the set, a summary representing the respective document, wherein providing the summary comprises, for each document, identifying content marked by hierarchical tags and generating the summary from the content marked by higher-order hierarchical tags;
   parsing the set of documents using a received set of search terms in order to calculate, for each document in the set, a first relevance value based on the summary of the respective document and not based on the respective document itself;
   parsing, from the set of documents and using the received set of search terms, only a subset of documents having the highest first relevance values in order to calculate, by operation of one or more computer processors and for each document in the subset, a second relevance value based on the respective document itself and not based on the summary of the respective document, wherein the subset excludes at least one document in the set and for which a second relevance value is not calculated, thereby avoiding a processing cost associated with calculating the second relevance value for the at least one document in the set; and
   providing query results comprising documents from the subset that have the highest second relevance values, regardless of the first relevance value of any document in the set, wherein the query results exclude the at least one document in the set and at least one document in the subset.

2. The computer-implemented method of claim 1, wherein the summary is based on a list of contents of the document.

3. The computer-implemented method of claim 1, wherein the summary is based on information embedded in the document by an author of document.

4. A system to query a set of documents based on multiple relevance value types, the system comprising:
   one or more computer processors;
   a memory containing a program which, when executed by the one or more computer processors, performs an operation comprising:
   providing, for each document in the set, a summary representing the respective document, wherein providing the summary comprises, for each document, identifying content marked by hierarchical tags and generating the summary from the content marked by higher-order hierarchical tags;
   parsing the set of documents using a received set of search terms in order to calculate, for each document in the set, a first relevance value based on the summary of the respective document and not based on the respective document itself;
   parsing, from the set of documents and using the received set of search terms, only a subset of documents having the highest first relevance values in order to calculate, for each document in the subset, a second relevance value based on the respective document itself and not based on the summary of the respective document, wherein the subset excludes at least one document in the set and for which a second relevance value is not calculated, thereby avoiding a processing cost associated with calculating the second relevance value for the at least one document in the set; and
   providing query results comprising documents from the subset that have the highest second relevance values, regardless of the first relevance value of any document in the set, wherein the query results exclude the at least one document in the set and at least one document in the subset.

5. The system of claim 4, wherein the summary is based on a list of contents of the document.

6. The system of claim 4, wherein the summary is based on information embedded in the document by an author of the document.

7. A computer program product to query a set of documents based on multiple relevance value types, the computer program product comprising:
    a computer-readable memory having computer-readable program code embodied therewith, the computer-readable memory including hardware, the computer-readable program code comprising:
    computer-readable program code configured to provide, for each document in the set, a summary representing the respective document, wherein providing the summary comprises, for each document, identifying content marked by hierarchical tags and generating the summary from the content marked by higher-order hierarchical tags;
    computer-readable program code configured to parse the set of documents using a received set of search terms in order to calculate, for each document in the set, a first relevance value based on the summary of the respective document and not based on the respective document itself;
    computer-readable program code configured to parse, from the set of documents and using the received set of search terms, only a subset of documents having the highest first relevance values in order to calculate, by operation of one or more computer processors when executing the computer-readable program code and for each document in the subset, a second relevance value based on the respective document itself and not based on the summary of the respective document, wherein the subset excludes at least one document in the set and for which a second relevance value is not calculated, thereby avoiding a processing cost associated with calculating the second relevance value for the at least one document in the set; and
    computer-readable program code configured to provide query results comprising documents from the subset that have the highest second relevance values, regardless of the first relevance value of any document in the set, wherein the query results exclude the at least one document in the set and at least one document in the subset.

8. The computer program product of claim 7, wherein the summary is based on a list of contents of the document.

9. The computer program product of claim 7, wherein the summary is based on information embedded in the document by an author of the document.

10. The computer-implemented method of claim 1, wherein the first relevance value of each document in the set is of a first relevance value type, wherein the second relevance value of each document in the subset is of a second relevance value type different from the first relevance value type, wherein the second relevance value of each document in the subset more accurately characterizes the respective document than the first relevance value of the respective document in the subset, wherein the first relevance value of each document in the subset is different from the second relevance value of the respective document in the subset.

11. The computer-implemented method of claim 10, wherein the summary for each document in the set excludes at least one element in the respective document, such that the summary for the respective document is smaller in length than the respective document, wherein computing the second relevance value of each document in the subset incurs a higher processing cost than computing the first relevance value of the respective document in the subset, wherein the method is to reduce a count of second relevance values computed, relative to computing second relevance values for all documents in the set, thereby providing the query results more efficiently than computing second relevance values for all documents in the set.

12. The computer-implemented method of claim 11, where each first relevance value comprises a summary relevance value, wherein each second relevance value comprises a document relevance value, wherein the summary for each document in the set is generated without requiring user intervention, wherein the set of documents is parsed without requiring user intervention, wherein the subset of documents is parsed without requiring user intervention, wherein the query results are provided without requiring user intervention, wherein each second relevance value is computed by an application.

13. The computer-implemented method of claim 12, wherein the application is configured to programmatically and independently generate the summary based on each individual document element selected from: (i) a list of contents of the document and (ii) information embedded in the document by an author of document;
    wherein the application is configured to, in a respective instance, provide the summary based on each individual approach selected from:
    for each document, identifying topics in the document, including a title; identifying a hierarchy for the topics in relation to the title; and generating the summary from the title and higher-order topics.

14. The computer-implemented of claim 13, wherein the application is configured to independently calculate the first and second relevance values based on each individual document element selected from: (i) an occurrence of the set of search terms in the summary of the document and (ii) an occurrence of the set of search terms in the text of the document;
    wherein the application is configured to independently calculate the first and second relevance values based on each individual document element selected from: (i) a further occurrence of term associations in the summary of the document and (ii) a further occurrence of term associations in the text of the document.

15. The computer-implemented method of claim 14, wherein the application includes:
    a documents database configured to store the set of documents;
    a summary database configured to store the summary provided for each document in the set of documents;
    an association dictionary configured to associate pairs of words in general use and associate pairs of words in technical domain, including synonym types, hyponym and hypernym types, and meronym and holonym types;
    a structural parser configured to generate the summary for each document in the set of documents;
    a semantic parser configured to tags topic and body text in each document in the set of documents; and
    a topic aligner configured to arrange tags in the summary for each document, into a tag hierarchy.

16. The computer-implemented method of claim 15, wherein the application further includes:
    a set relevance engine configured to calculate the first relevance value for each document in the set of documents;
    a subset grouper configured to programmatically identify the subset of documents having the highest first relevance values;

a subset relevance engine configured to calculate the second relevance value for each document in the subset of documents;
a query results grouper configured to generate the query results based on the second relevance value for each document in the subset of documents; and
a query module configured to provide control logic for the structural parser, the semantic parser, the topic aligner, the set relevance engine, the subset grouper, the subset relevance engine, and the query results grouper, respectively.

* * * * *